US009840301B2

(12) United States Patent
Barak et al.

(10) Patent No.: US 9,840,301 B2
(45) Date of Patent: Dec. 12, 2017

(54) CARGO CYCLE WITH PASSENGER SEATS

(71) Applicants: Hagai Barak, Tel Aviv (IL); Amit Barak, Tel Aviv (IL); Michael Heimann, Lapid (IL); Oron Lazarovich, Rehovot (IL)

(72) Inventors: Hagai Barak, Tel Aviv (IL); Amit Barak, Tel Aviv (IL); Michael Heimann, Lapid (IL); Oron Lazarovich, Rehovot (IL)

(73) Assignee: Taga Bikes Ltd, Tel Aviv (IL)

( * ) Notice: Subject to any disclaimer, the term of this patent is extended or adjusted under 35 U.S.C. 154(b) by 90 days.

(21) Appl. No.: 14/804,344

(22) Filed: Jul. 21, 2015

(65) Prior Publication Data
US 2017/0021890 A1 Jan. 26, 2017

(51) Int. Cl.
| | | |
|---|---|---|
| B62J 1/00 | (2006.01) | |
| B62K 7/02 | (2006.01) | |
| B62J 1/08 | (2006.01) | |
| B62J 1/16 | (2006.01) | |
| B62J 9/00 | (2006.01) | |
| B62K 27/00 | (2006.01) | |
| B60N 2/22 | (2006.01) | |
| B62K 7/00 | (2006.01) | |

(52) U.S. Cl.
CPC .............. *B62K 7/02* (2013.01); *B60N 2/2209* (2013.01); *B62J 1/08* (2013.01); *B62J 1/16* (2013.01); *B62J 1/167* (2013.01); *B62J 9/003* (2013.01); *B62K 7/00* (2013.01); *B62K 27/00* (2013.01)

(58) Field of Classification Search
CPC ... B62K 7/00; B62K 7/02; B62K 7/04; B62K 27/00; B60N 2/2209; B62J 1/16; B62J 1/167; B62J 9/003

USPC .......................................................... 280/202
See application file for complete search history.

(56) References Cited

U.S. PATENT DOCUMENTS

| | | | | |
|---|---|---|---|---|
| 1,427,417 A | * | 8/1922 | Rickey ..................... | B62K 5/02 280/202 |
| 1,540,271 A | * | 6/1925 | Mayer ..................... | B62K 9/02 280/202 |

(Continued)

FOREIGN PATENT DOCUMENTS

| | | |
|---|---|---|
| CN | 2630101 | 8/2004 |
| DE | 9302220 | 4/1993 |

(Continued)

OTHER PUBLICATIONS

PCT Search Report and Written Opinion PCT/IB2016/054279, dated Jan. 23, 2017.

*Primary Examiner* — Tony Winner
(74) *Attorney, Agent, or Firm* — Dekel Patent Ltd.; David Klein

(57) ABSTRACT

A cargo cycle includes a frame, a plurality of wheels and a rider seat assembled on the frame, and a passenger compartment supported on the frame. The passenger compartment includes a plurality of side walls and at least one passenger seat disposed inwards of the side walls. The passenger seat has a plurality of reclining positions reclined at different angles relative to the side walls. The passenger seat includes a back support and a seat portion. The back support has a folded orientation in which it is folded down parallel to the seat portion and forms a cover of the passenger compartment.

14 Claims, 19 Drawing Sheets

(56) References Cited

U.S. PATENT DOCUMENTS

| | | | | |
|---|---|---|---|---|
| 1,661,257 A * | 3/1928 | Kirch | ................. | B62K 5/05 |
| | | | | 280/202 |
| 4,546,992 A * | 10/1985 | Swartz | ................. | B62K 5/02 |
| | | | | 280/202 |
| 5,193,831 A * | 3/1993 | Capitoli | ............. | B62K 27/00 |
| | | | | 280/202 |
| 5,292,142 A * | 3/1994 | Vitarelli | ............. | B62K 27/02 |
| | | | | 280/202 |
| 5,863,058 A * | 1/1999 | Jinks | ................. | B62K 7/00 |
| | | | | 280/202 |
| 6,334,652 B1 | 1/2002 | Chen | | |
| 7,331,629 B2 * | 2/2008 | Knaven | ............ | B62J 1/16 |
| | | | | 280/202 |
| 7,992,889 B2 * | 8/2011 | Ehrenreich | ...... | B62B 7/12 |
| | | | | 280/202 |
| 8,864,221 B1 * | 10/2014 | Delvilla | ............ | A47C 7/62 |
| | | | | 297/180.11 |
| 9,150,271 B1 * | 10/2015 | Liu | .................. | B62K 27/10 |
| 2003/0067128 A1 * | 4/2003 | Fireman | ........... | B62B 15/00 |
| | | | | 280/19 |

FOREIGN PATENT DOCUMENTS

| | | |
|---|---|---|
| DE | 20201407303 | 10/2014 |
| WO | 97/02172 | 1/1997 |

\* cited by examiner

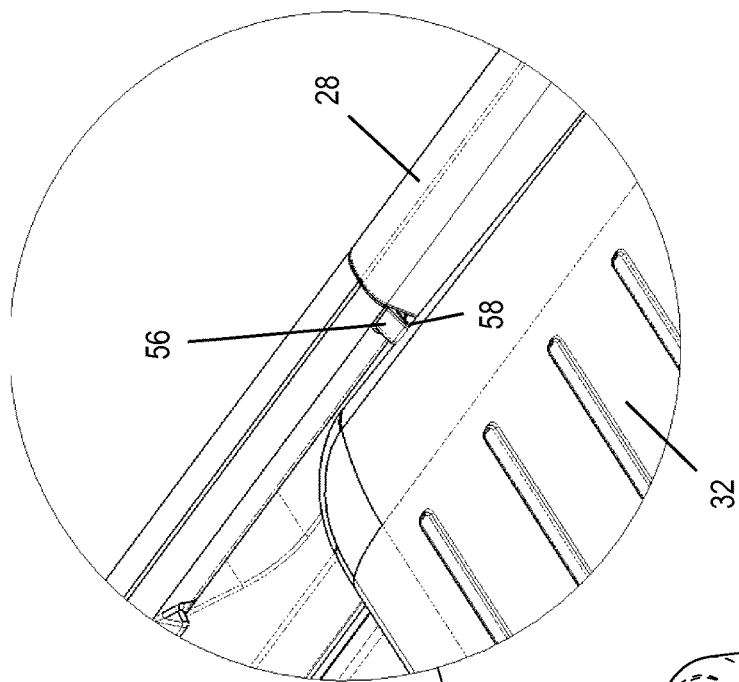
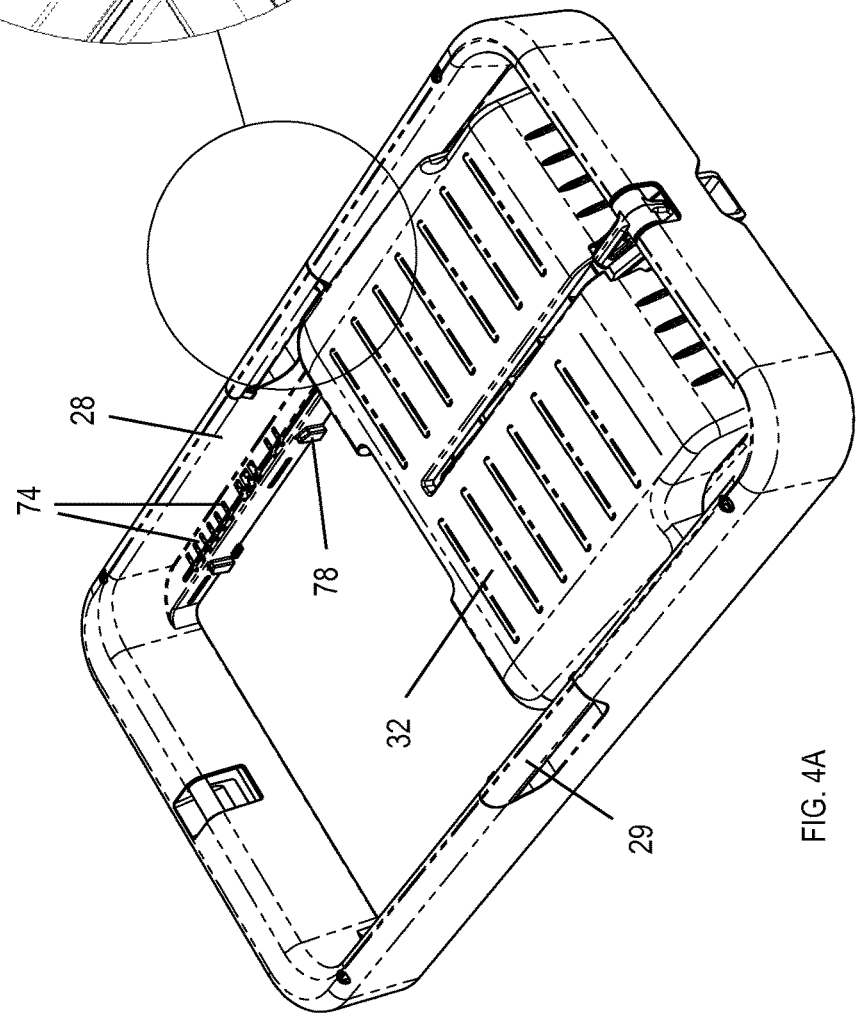
FIG. 4B
FIG. 4A

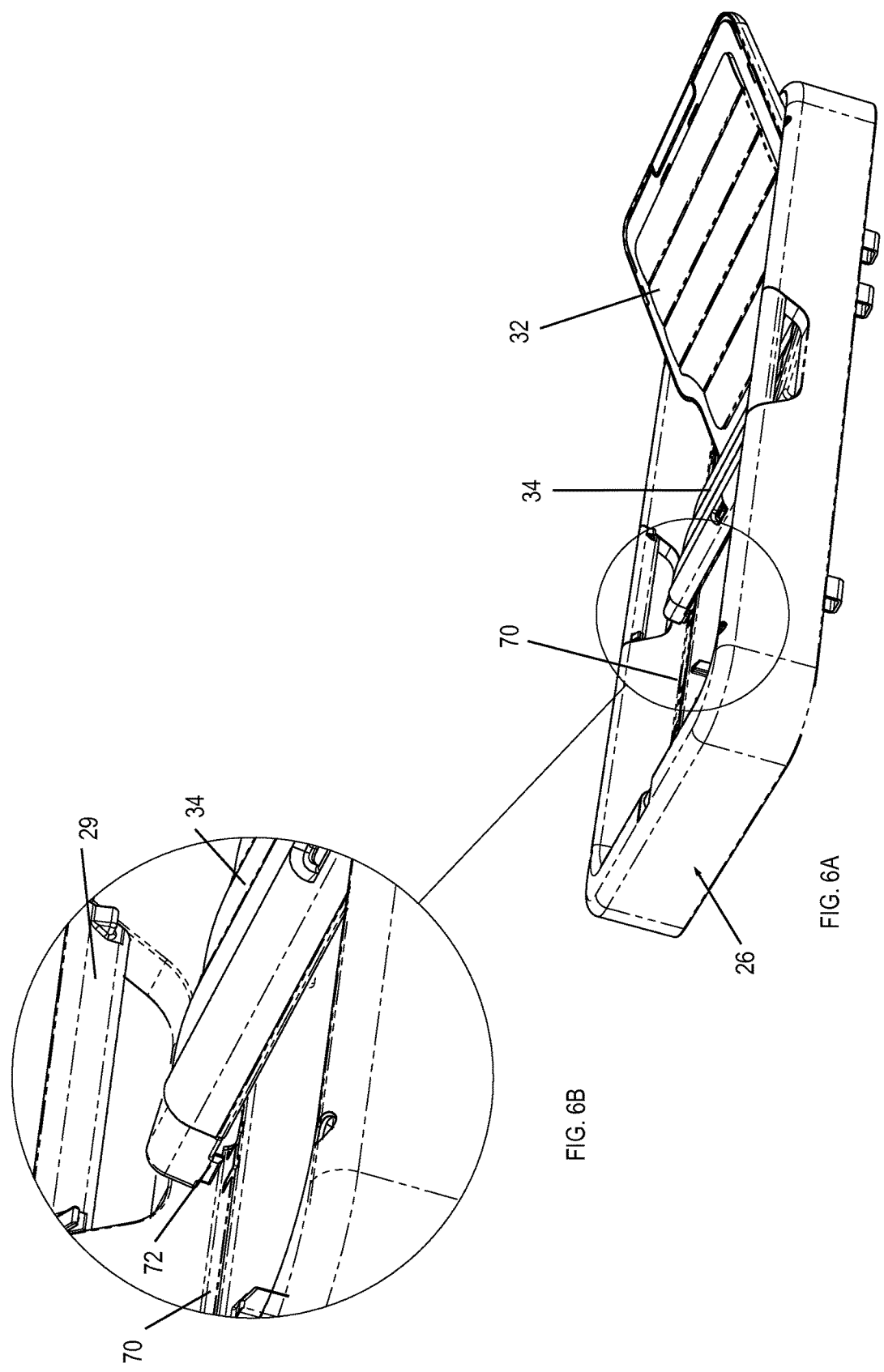

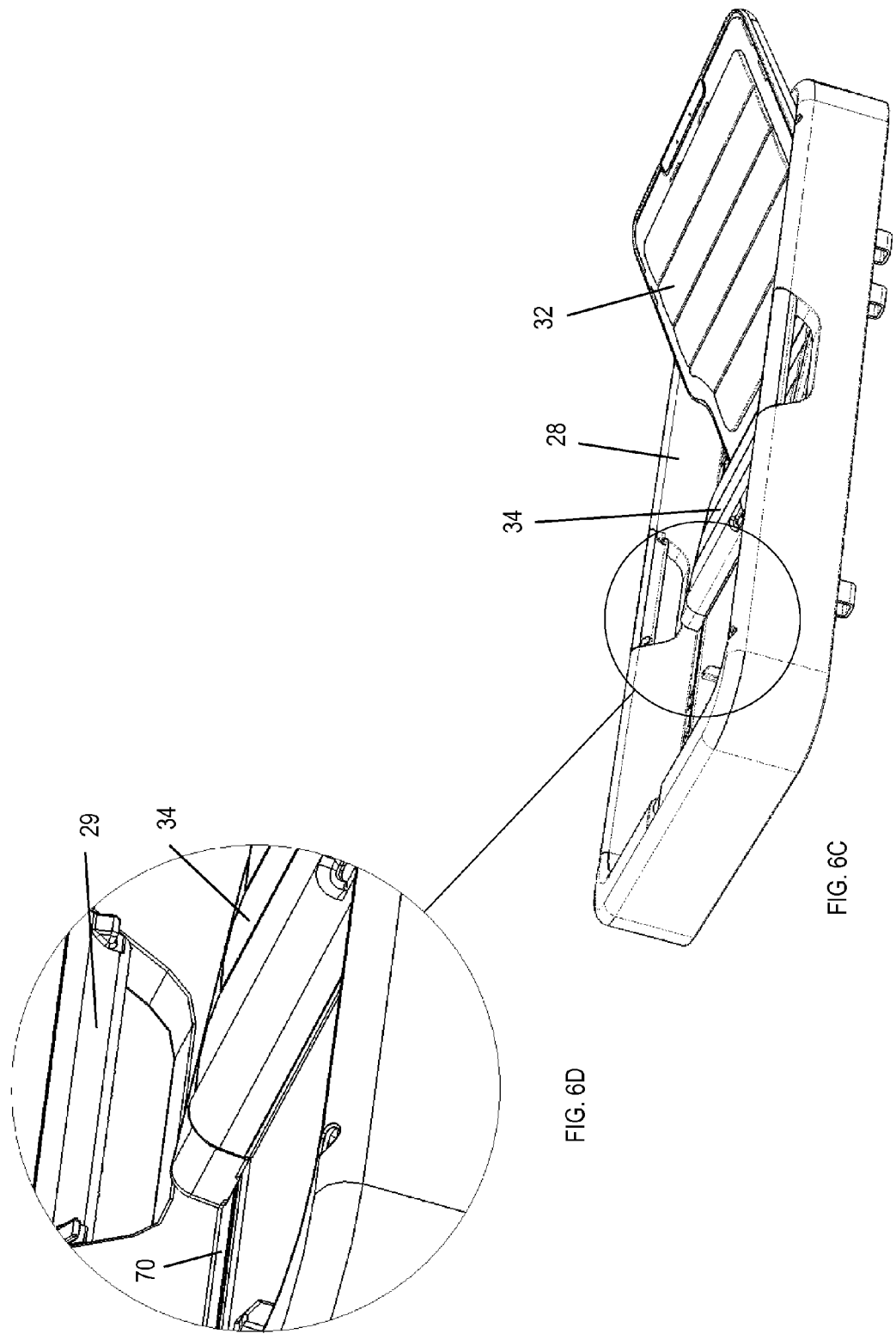

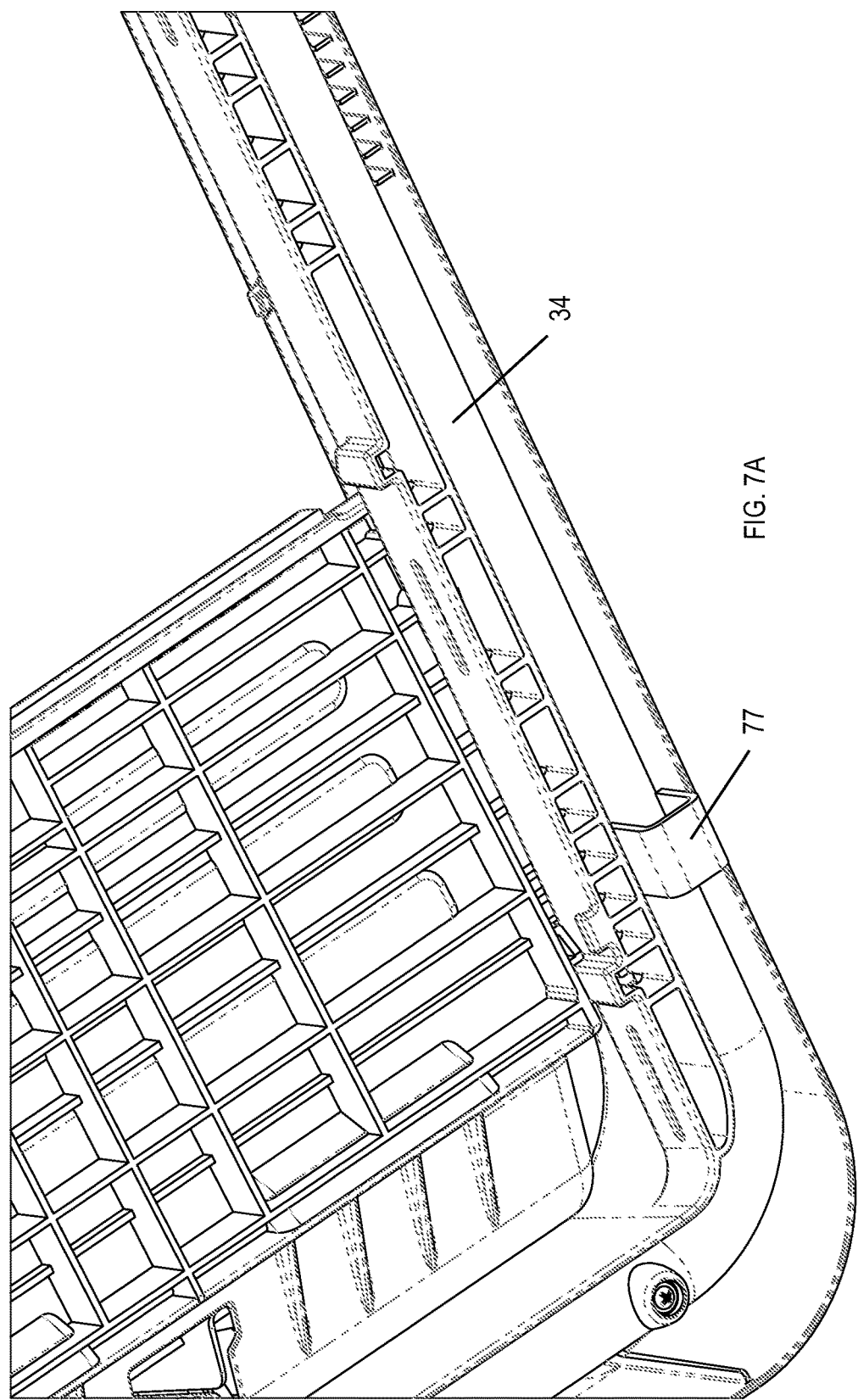

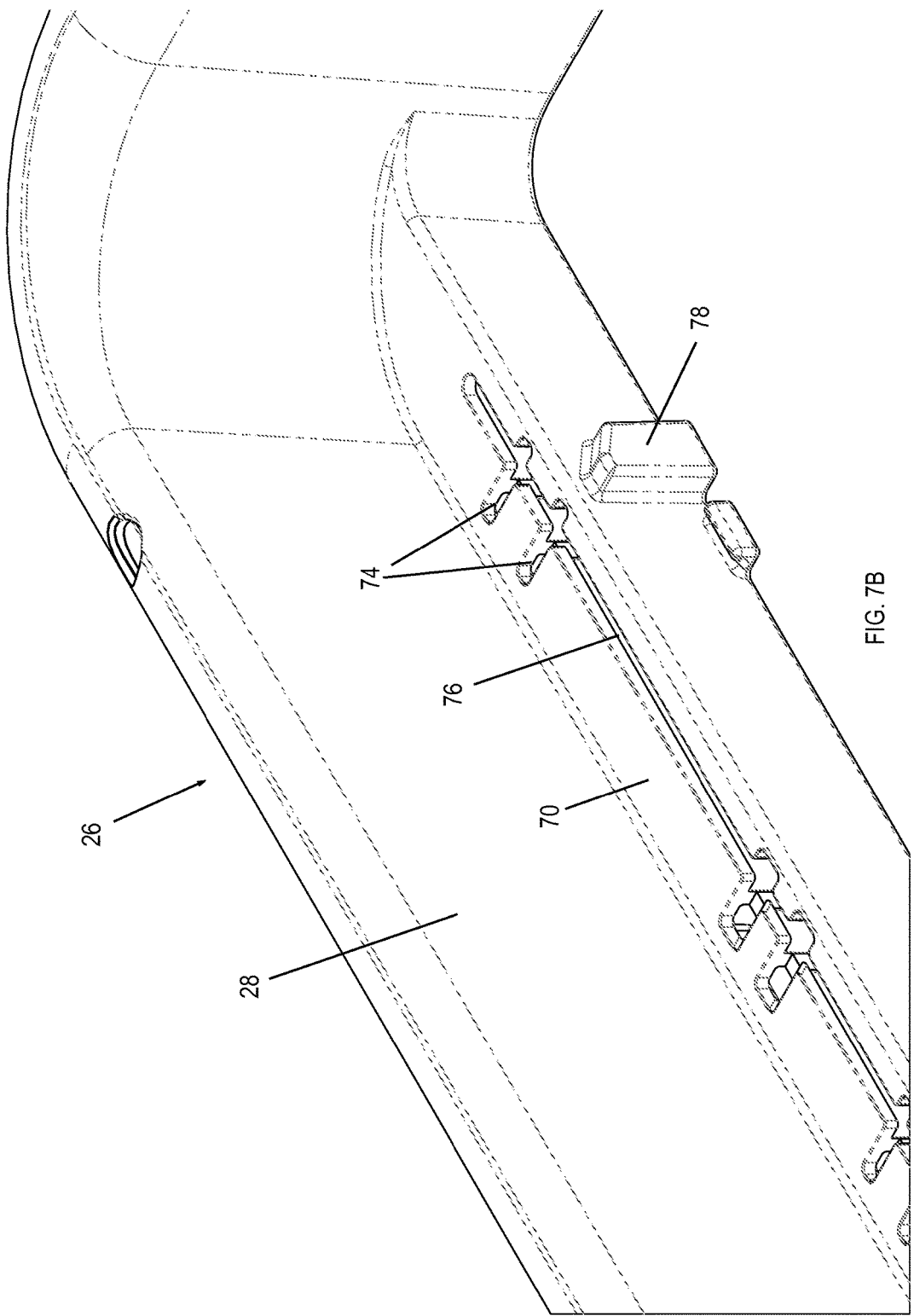

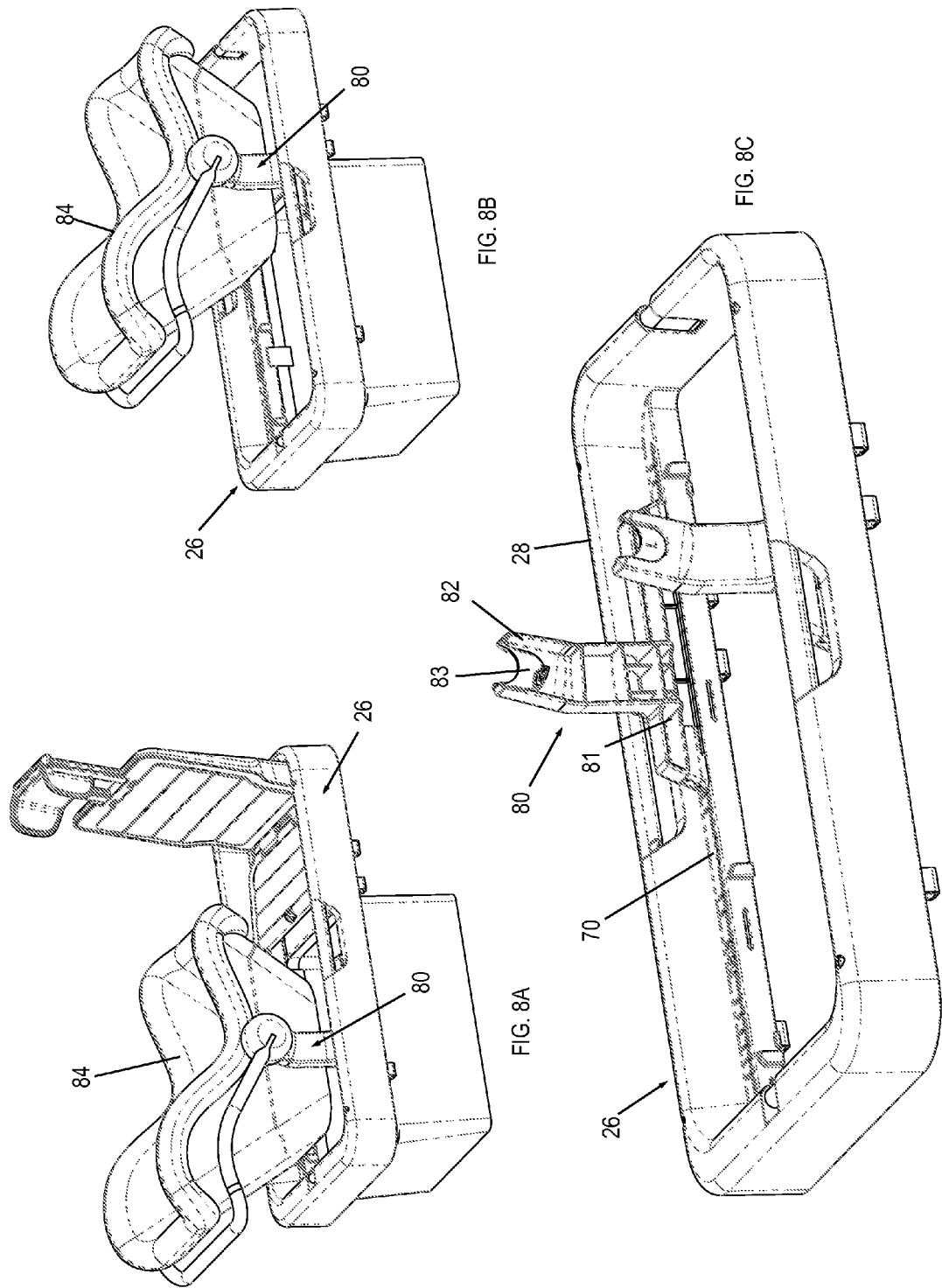

CARGO CYCLE WITH PASSENGER SEATS

FIELD OF THE INVENTION

The present invention generally relates to cargo cycles or pedicabs, and more specifically to a cargo cycle with adjustable and/or reclining passenger seats.

BACKGROUND OF THE INVENTION

There are many kinds of human-powered bicycles or tricycles, with or without electrical assist, for conveying cargo or freight, including human passengers. Such vehicles are referred to herein as cargo cycles, and encompass any kind of cargo or freight cycle or pedicab.

In many regions of the world, two or three-wheeled vehicles are used to transport children. In many cases, the children sit in a box-like compartment in the front or rear of the cycle.

SUMMARY OF THE INVENTION

The present invention seeks to provide a novel cargo cycle with adjustable and/or reclining passenger seats, as is described in detail further hereinbelow.

There is thus provided in accordance with a non-limiting embodiment of the present invention a cargo cycle including a frame, a plurality of wheels and a rider seat assembled on the frame, and a passenger compartment supported on the frame, the passenger compartment including a plurality of side walls and at least one passenger seat disposed inwards of the side walls, the at least one passenger seat having a plurality of reclining positions reclined at different angles relative to the side walls, wherein the at least one passenger seat includes a back support and a seat portion, the back support having a folded orientation in which it is folded down parallel to the seat portion and forms a cover of the passenger compartment. In some embodiments, the passenger seat in the folded orientation does not protrude above the side walls of the passenger compartment.

In accordance with a non-limiting embodiment of the present invention the passenger compartment includes a bottom member, and in the folded orientation, the bottom member, the side walls and the back support form a closed box.

In accordance with a non-limiting embodiment of the present invention the at least one passenger seat includes a back support, a seat portion and a headrest adjustably connected to the back support.

In accordance with a non-limiting embodiment of the present invention harness straps are attached to the headrest through apertures formed in the at least one passenger seat.

In accordance with a non-limiting embodiment of the present invention two passenger seats face each other, and each of the passenger seats includes a back support and a seat portion, wherein the back support has a folded orientation in which it is folded down parallel to the seat portion.

In accordance with a non-limiting embodiment of the present invention the at least one passenger seat includes a back support and a seat portion, wherein the back support is pivotally mounted to a pivot axis in at least one of the side walls.

In accordance with a non-limiting embodiment of the present invention the back support includes a pivot element pivotally mounted to the pivot axis, the pivot element slidingly received in a groove formed in the back support, wherein movement between the plurality of reclining positions includes linear movement of the seat portion which causes the pivot element to slide in the groove and the back support to pivot about the pivot axis. A releasable catch may be disposed in the groove and is releasably engageable with the pivot element.

In accordance with a non-limiting embodiment of the present invention the back support and one of the side walls include mating arresting members, such that when the back support is in the folded orientation, the arresting members are releasably engaged with each other.

In accordance with a non-limiting embodiment of the present invention the at least one passenger seat includes a back support and a seat portion, wherein the seat portion and one of the side walls include mating stoppers that limit linear movement of the seat portion.

In accordance with a non-limiting embodiment of the present invention the at least one passenger seat includes a back support and a seat portion, wherein the seat portion is movable along rails, each of the rails being disposed along a length of each of a pair of the side walls, and wherein the seat portion includes a protrusion receivable in any of a plurality of receiving members formed in the rails.

In accordance with a non-limiting embodiment of the present invention one of the side walls includes a latch member engageable with one of a plurality of latch receiving members formed on a rear portion of the at least one passenger seat.

In accordance with a non-limiting embodiment of the present invention two of the side walls include hand grip members.

BRIEF DESCRIPTION OF THE DRAWINGS

The present invention will be understood and appreciated more fully from the following detailed description taken in conjunction with the drawing in which:

FIGS. 4A and 4B are simplified pictorial and enlarged illustrations, respectively, of the cargo cycle with just one passenger seat, wherein the folded back support of the passenger seat and one of the side walls have mating arresting members releasably engaged with each other;

FIGS. 6A and 6B are simplified pictorial and enlarged illustrations, respectively, of moving the seat portion along rails of the side walls, wherein the seat portion is lifted out of receiving members formed in the rails to permit moving the seat portion to another position along the length of the rails;

FIGS. 6C and 6D are simplified pictorial and enlarged illustrations, respectively, of the seat portion moved to another position along the rails, wherein the seat portion is received in receiving members formed in the rails;

FIGS. 7A and 7B are simplified illustrations of mating stoppers on the seat portion and side walls that limit linear movement of the seat portion;

FIGS. 8A, 8B and 8C are simplified pictorial illustrations of an accessory adapter, in accordance with a non-limiting embodiment of the present invention, wherein FIG. 8A shows a car seat with a passenger seat, FIG. 8B shows the car seat without a passenger seat, and FIG. 8C shows the car seat adaptor in more detail;

FIGS. 9A, 9B and 9C are simplified pictorial illustrations of a hood with mounting arms that mount on sides of the seat of the cycle, wherein FIGS. 9A and 9B show different the hood at different vertical heights along mounting arms, and FIG. 9C shows the hood mounted to the cycle.

DETAILED DESCRIPTION OF EMBODIMENTS

Figure 1A:
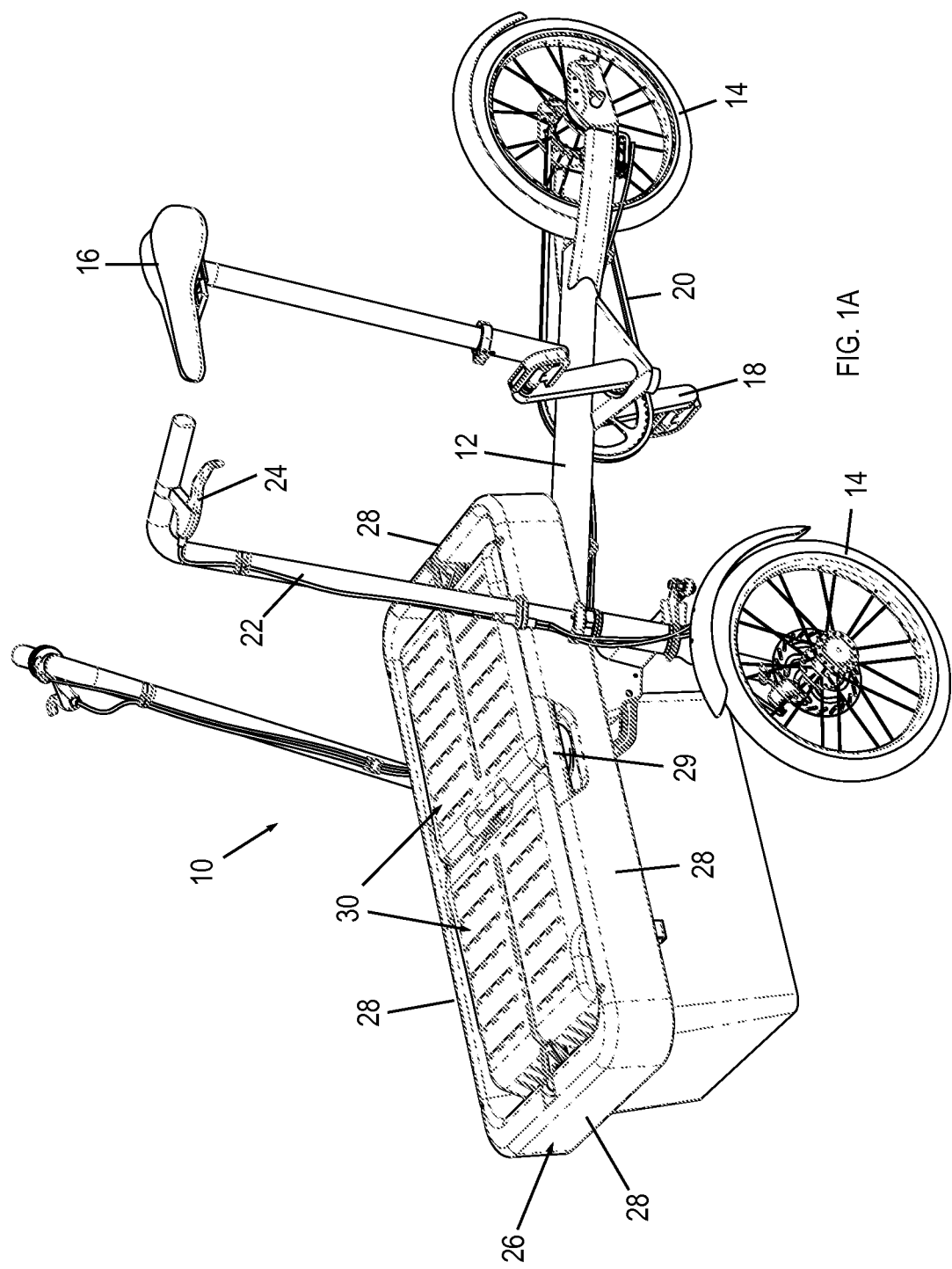
FIG. 1A is a simplified illustration of a cargo cycle, constructed and operative in accordance with a non-limiting embodiment of the present invention, with a passenger compartment having a pair of passenger seats in a folded orientation.

Reference is now made to FIG. 1A, which illustrates a cargo cycle 10 in accordance with a non-limiting embodiment of the present invention.

The cargo cycle 10 includes a frame 12 and a plurality of wheels 14 (in the illustrated embodiment there are three wheels, but the invention can be carried out with two or more wheels). A rider seat 16 is assembled on frame 12. Pedals 18 are provided for powering cargo cycle 10 via a chain drive mechanism 20. Optionally, cargo cycle 10 may be electrically assisted with a battery and motor, as is known in the art. Handlebars 22 and brakes 24 are provided, as is known in the art.

A passenger compartment 26 is supported on frame 12, such as by attachment with fasteners (e.g., quick release fasteners) to the front part of frame 12 forward of rider seat 16, or alternatively, rearward of rider seat 16, or further alternatively, to either side of rider seat 16. Passenger compartment 26 includes a plurality of side walls 28 and one or more passenger seats 30 (in the illustrated embodiment there is a pair of seats 30 that face each other, but which alternatively could face in the same direction) disposed inwards of side walls 28. As will be described below, each passenger seat 30 has a plurality of reclining positions reclined at different angles relative to the side walls 28.

Figure 1B:
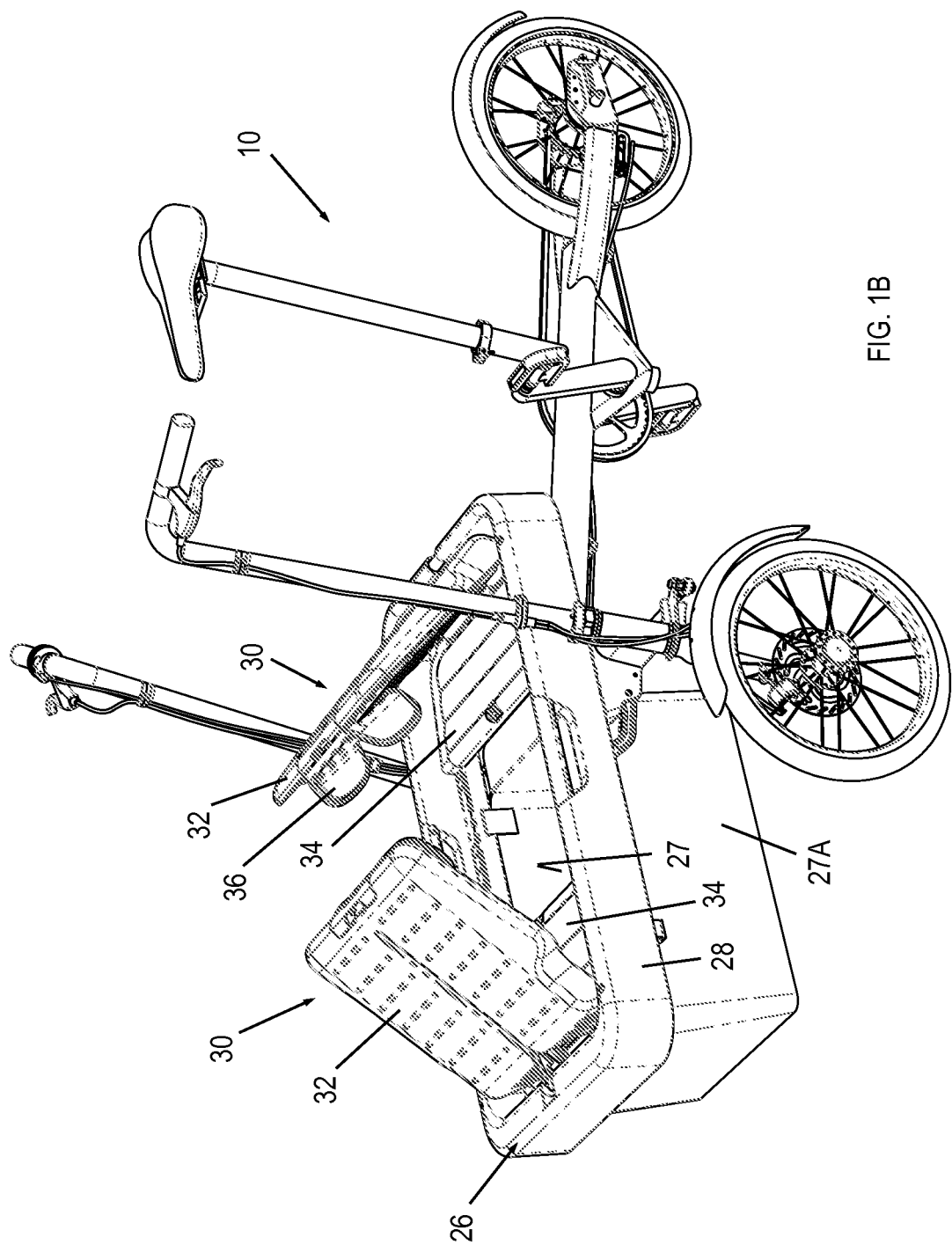
FIG. 1B is a simplified illustration of the cargo cycle of FIG. 1A, with a back support of each passenger seat being lifted upwards from the folded orientation.

Reference is now made to FIG. 1B. Passenger seat 30 includes a back support 32, a seat portion 34 and a headrest 36 adjustably connected to back support 32. The back support 32 has a folded orientation (FIG. 1A) in which it is folded down parallel to the seat portion 34 and forms a cover of passenger compartment 26. In one embodiment, passenger compartment 26 is open at the bottom. Alternatively, passenger compartment may include a bottom member 27, such as a floor and/or storage compartment 27A, as seen in FIG. 1B. It is noted that storage compartment 27A does not necessarily extend the entire length of passenger compartment 26. In the folded orientation, bottom member 27, side walls 28 and back support 32 form a closed box (FIG. 1A).

In some embodiments, in the folded orientation, passenger seat 30 does not protrude above the side walls 28 of passenger compartment 26 (as seen in FIG. 1A). In this manner, when passenger seat 30 is folded and flush with the side walls, more cargo can be loaded on the covers and carried by passenger compartment 26.

Two opposing side walls 28 may include hand grip members 29, such as cutouts for placing hands therein or handles, such as retracting handles. The hand grip members 29 are useful for gripping and removing passenger compartment 26 from the cycle and carrying passenger compartment 26 to different places as a separate unit. The bottom member 27 can be made of flexible fabric and can be folded into the passenger compartment 26 when the compartment unit is removed.

Figure 1C:
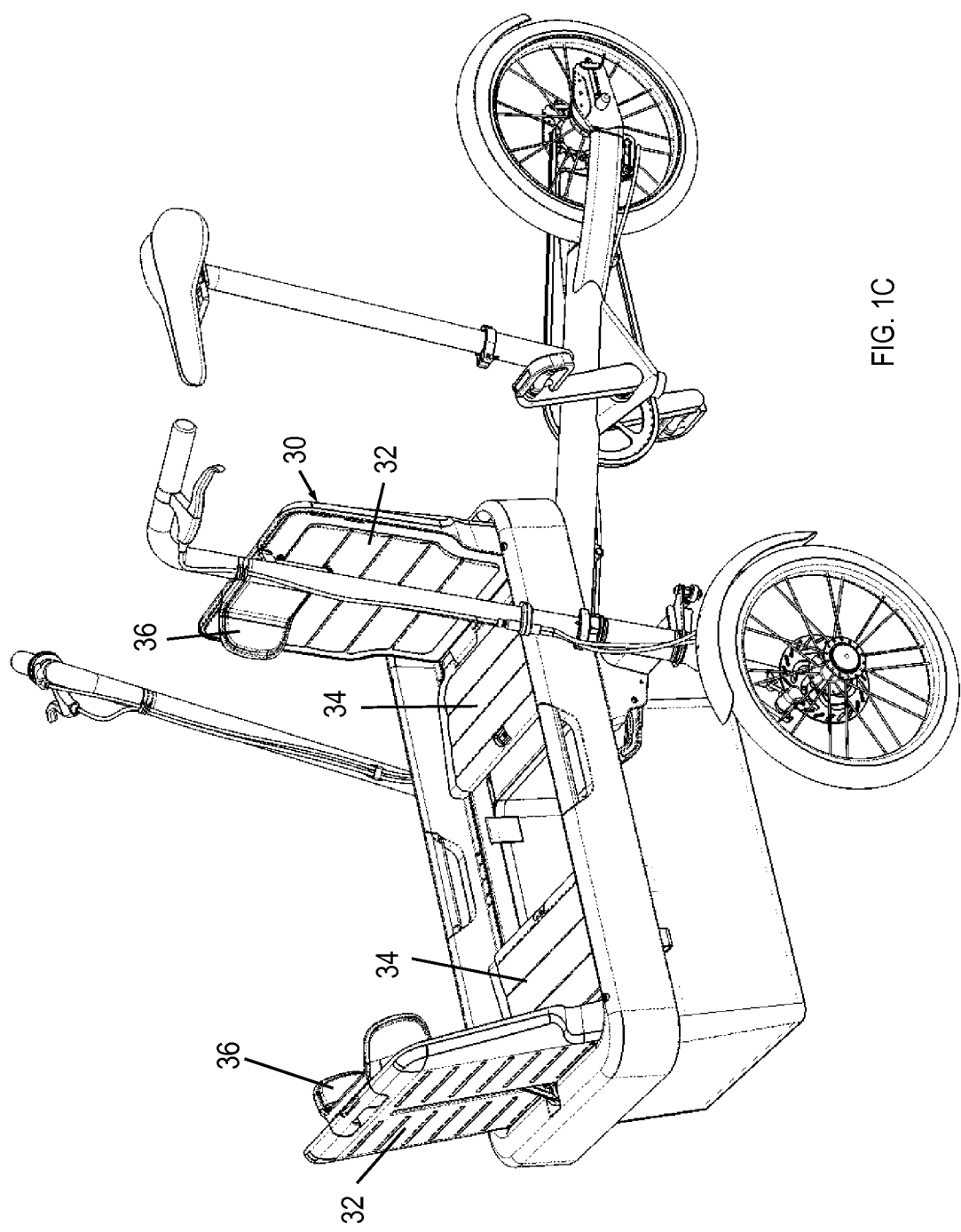
FIG. 1C is a simplified illustration of the cargo cycle of FIG. 1A, with the back support of each passenger seat in an upright position.
Figure 1D:
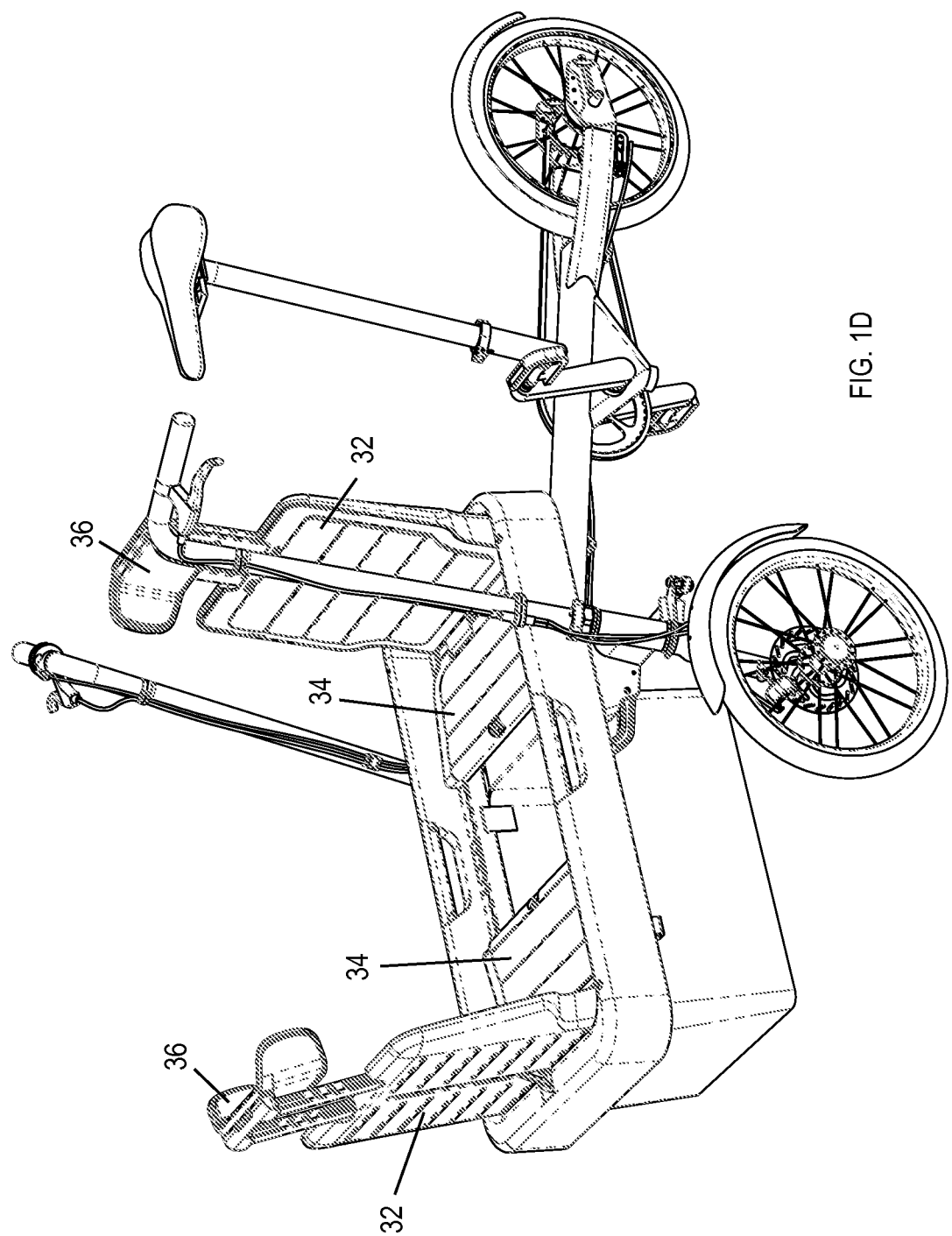
FIG. 1D is a simplified illustration of the cargo cycle of FIG. 1A, with headrests raised from the back supports of the passenger seats.

In FIG. 1B, back support 32 is lifted upwards from the folded orientation. In FIG. 1C, back support 32 is in an upright position. In FIG. 1D, headrest 36 is raised from back support 32.

Figure 2:
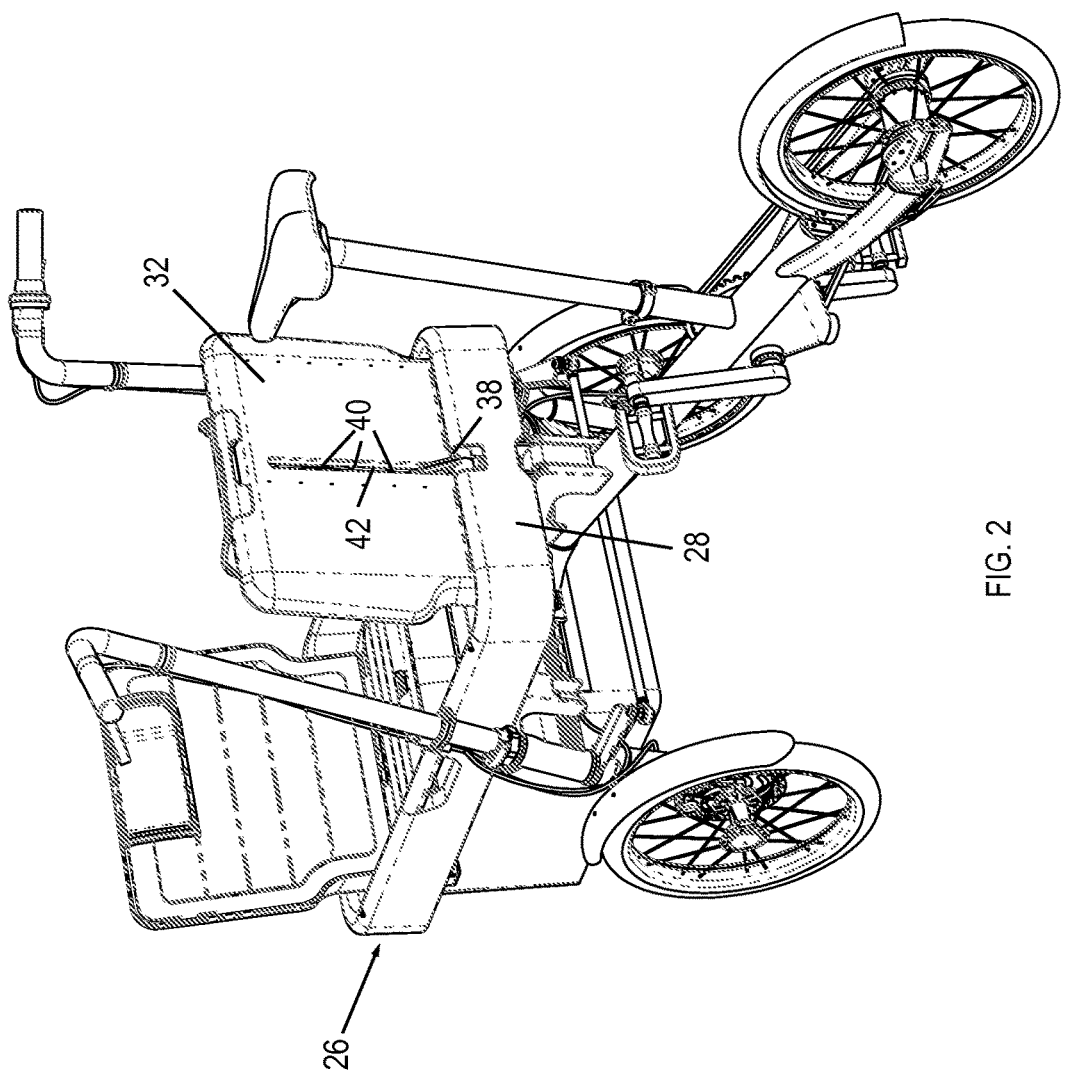
FIG. 2 is a simplified illustration of the cargo cycle of FIG. 1A, showing a rear portion of the back support of the passenger seat, and a latch member of one of the side walls of the passenger compartment engaged with a latch receiving member formed in the rear portion of the passenger seat.

Reference is now made to FIG. 2. In accordance with a non-limiting embodiment of the present invention, one of the side walls 28 includes a latch member 38 engageable with one of a plurality of latch receiving members 40 formed on a rear portion of passenger seat 30. The latch receiving members 40 may be notches formed in a channel 42 formed in the rear portion of back support 32. The engagement of latch member 38 with latch receiving member 40 steadies and fixes the back support 32 at a selected reclining position.

Figure 3A:
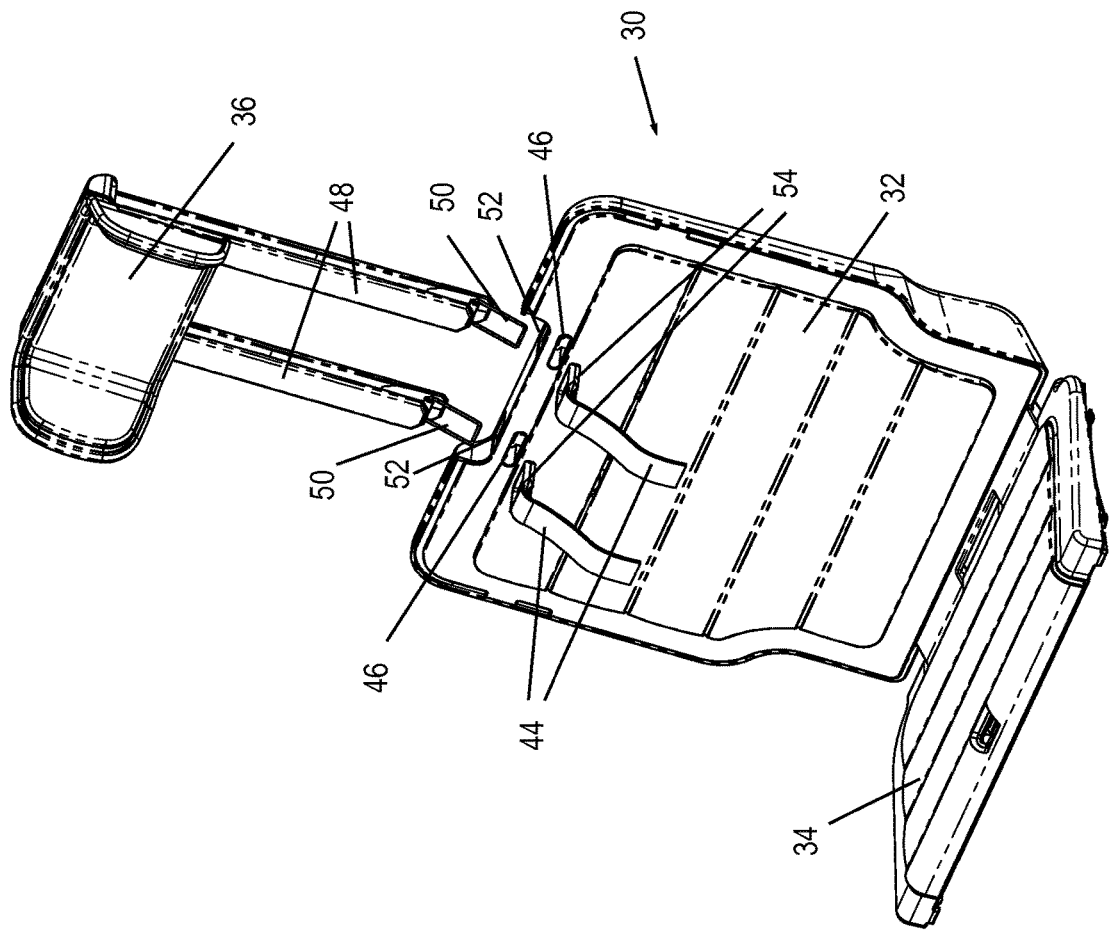
FIGS. 3A and 3B are simplified illustrations of the headrest, respectively before and after attachment to the passenger seat and to harness straps.
Figure 3B:
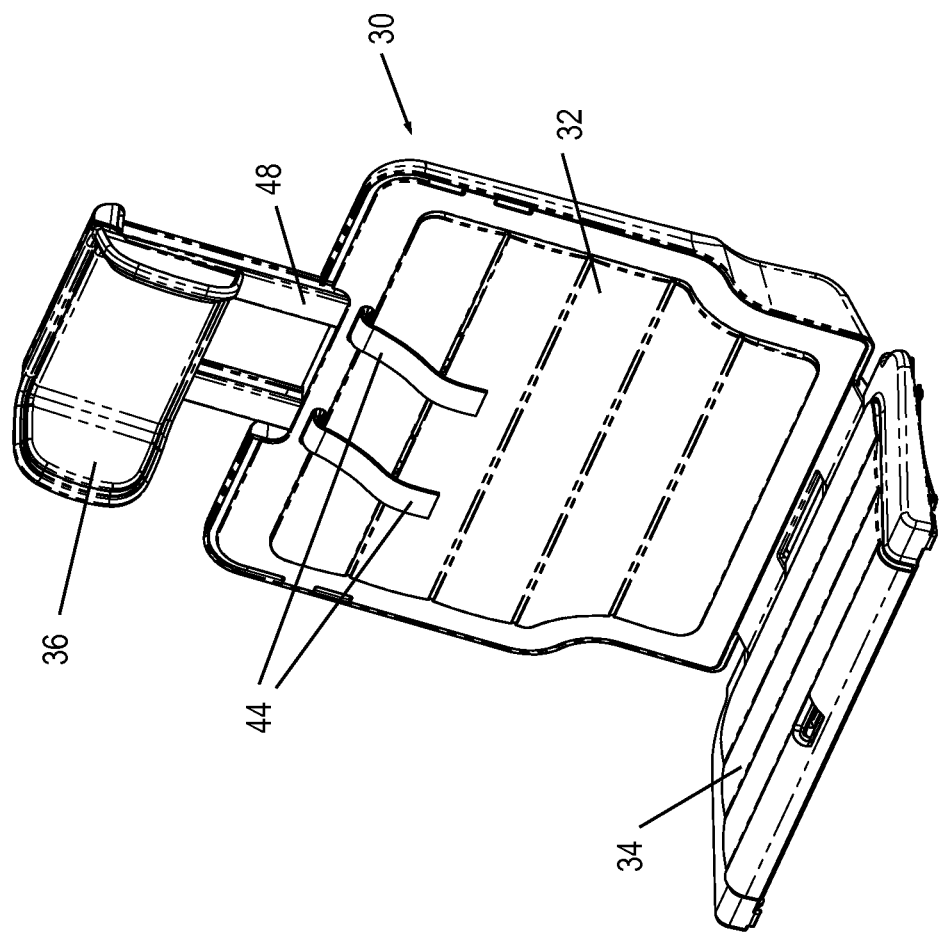

Reference is now made to FIG. 3A. In accordance with a non-limiting embodiment of the present invention, harness straps 44 are attached to headrest 36 through apertures 46 formed in passenger seat 30, such as in back support 32. Each harness strap 44 is provided with a clasp 54. Headrest 36 is mounted on a pair of elongate members 48 which terminate in loops 50. The elongate members 48 are inserted through another set of openings 52 formed in back support 32. After insertion in openings 52, elongate members 48 are received through clasps 54. The elongate members 48 lock the clasps 54 in place, thereby securing harness straps 44 to back support 32 of passenger seat 30, as seen in FIG. 3B. Apertures 46 may be formed at different heights of passenger seat 30 so that harness straps 44 can be affixed at different heights.

Reference is now made to FIGS. 4A and 4B. In accordance with a non-limiting embodiment of the present invention, back support 32 and one or more of the side walls 28 include mating arresting members 56 and 58, such as a protruding lug 56 that protrudes from side wall 28 and is received in a notch 58 formed in back support 32 (or alternatively, the protruding lug protrudes from the back support and the notch is in the side wall). In this manner, when back support 32 is in the folded orientation, the arresting members 56 and 58 are releasably engaged with each other and back support 32 is releasably locked with respect to side wall 28. Arresting member 56 may be pressed down for releasing from notch 58. Arresting members 56 and 58 assure that when back supports 32 are folded, they will not reopen or shake during the ride.

Figure 5A:
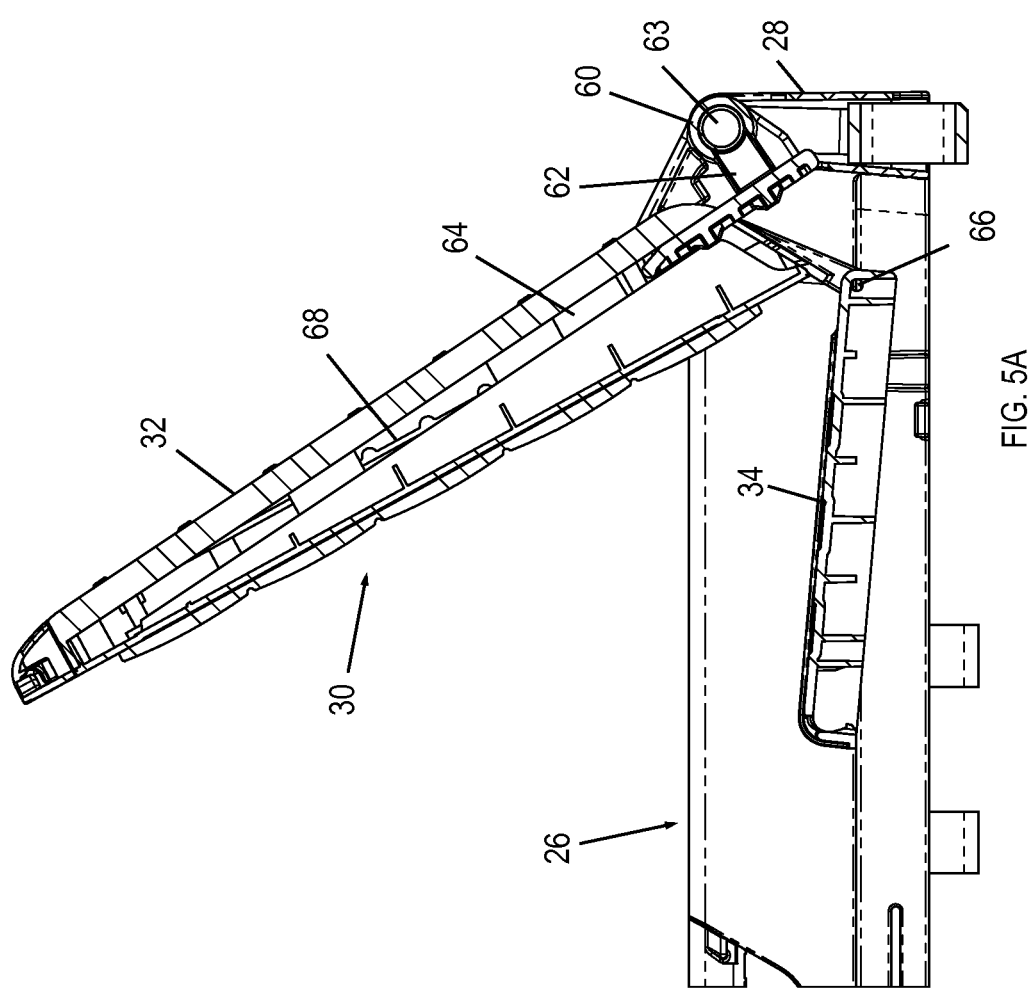
FIGS. 5A-5C are simplified illustrations of different reclining positions of the passenger seat reclined at different angles relative to the side walls of the passenger compartment.
Figure 5B:
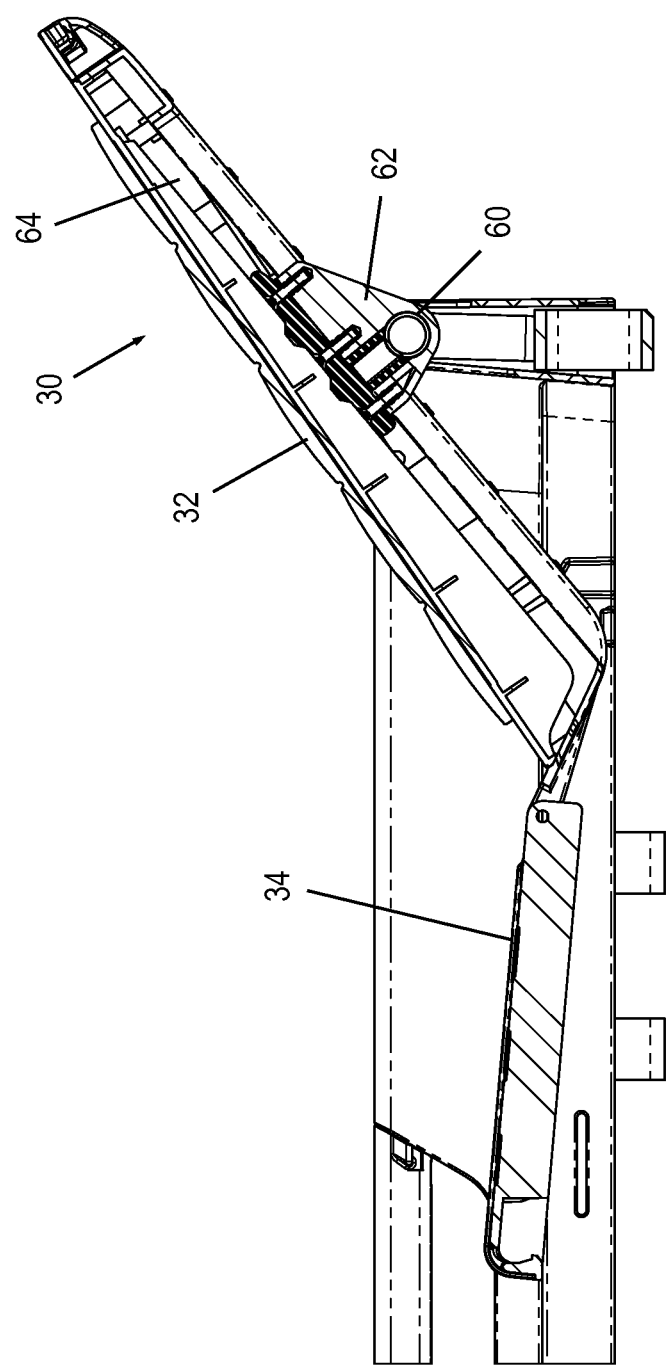
Figure 5C:
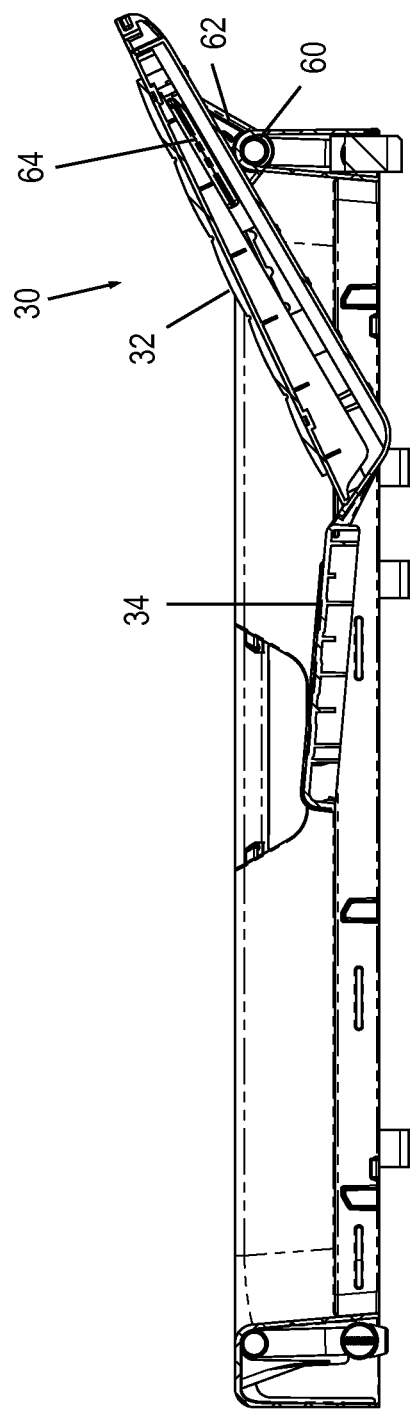

Reference is now made to FIGS. 5A-5C. In accordance with a non-limiting embodiment of the present invention, back support 32 is pivotally mounted to a pivot axis 60 in one or more side walls 28. (The pivot axis is any pin, axle or the like on which the back support can pivot.) A pivot element 62 is slidingly received in a groove 64 formed in back support 32. Pivot element 62 is pivotally mounted to pivot axis 60 (e.g., pivot element 62 has a cylindrical protrusion 63 which is journaled in a bushing that forms the pivot axis 60). Back support 32 may pivot with respect to seat portion 34 at a pivot 66 (e.g., pinned connection). As seen by comparing FIGS. 5A-5C, movement of passenger seat 30 between the plurality of reclining positions includes linear movement of seat portion 34 (along the horizontal axis in FIGS. 5A-5C) which causes pivot element 62 to slide in groove 64 and back support 32 to pivot about pivot axis 60. A releasable catch 68 may be disposed in groove 64, which may serve as a height stop for headrest 36. Releasable catch 68 may optionally be releasably engageable with pivot element 62, so that pivot element 62 is releasably locked at the selected reclining position.

Reference is now made to FIGS. 6A-6D. In accordance with a non-limiting embodiment of the present invention, seat portion 34 is movable along rails 70. Each rail 70 is disposed along a length of one wall 28 of an opposing pair of side walls 28. Seat portion 34 includes a protrusion 72 (FIG. 6B) receivable in any of a plurality of receiving members 74 formed in rail 70 (as seen best in FIG. 7B). Referring to FIG. 7B, receiving members 74 may be transverse slots formed at different stations along a groove 76 formed in rail 70. A safety element, such as a protrusion 78 protruding from side wall 28, is provided in order to prevent back support 32 from folding down accidently when a child or other passenger is sitting on seat portion 34. The protrusion 78 blocks the seat portion 34 from limitlessly sliding which in turn prevents back support 32 from folding down. In order to fold the back support 32, the seat portion 34 must be lifted to go over safety element (protrusion) 78. As seen in FIGS. 6A-6B, the seat 30 must be lifted to lift seat portion 34 out of the groove in rail 70; the seat 30 can then be moved along the length of rail 70 to another position where the seat portion 34 is once again seated in rail 70, i.e., protrusion 72 (FIG. 6B) is once again received in another one receiving members 74.

As another example, if there is a sudden deceleration or acceleration of the cargo cycle, safety element 78 will prevent passenger seat 26 from dislodging and uncontrollably moving forward or backward, thereby preventing harm to passengers.

Referring to FIG. 7A, a connecting element 77 may be used to fasten the passenger compartment 26 to the cycle frame.

Reference is now made to FIGS. 8A, 8B and 8C, which illustrate an accessory adapter 80, which is just one example of an accessory that can be attached to the side walls 28 or other portion of passenger compartment 26. Accessory adapter 80 includes a bar of any shape with one end 81 connected to rails 70 on side wall 28 (such as by press fit, click fit or with a fastener) and an opposite end 82 that includes a fastener 83 (such as a spring-loaded latch) which fastens on to an accessory, e.g., a car seat 84. Accessory adapter 80 is connected on rails 70 and can be positioned in different places on rail 70. Other items, such as but not limited to, bars, toys, etc., can similarly be connected to accessory adapter 80.

Figure 9B:
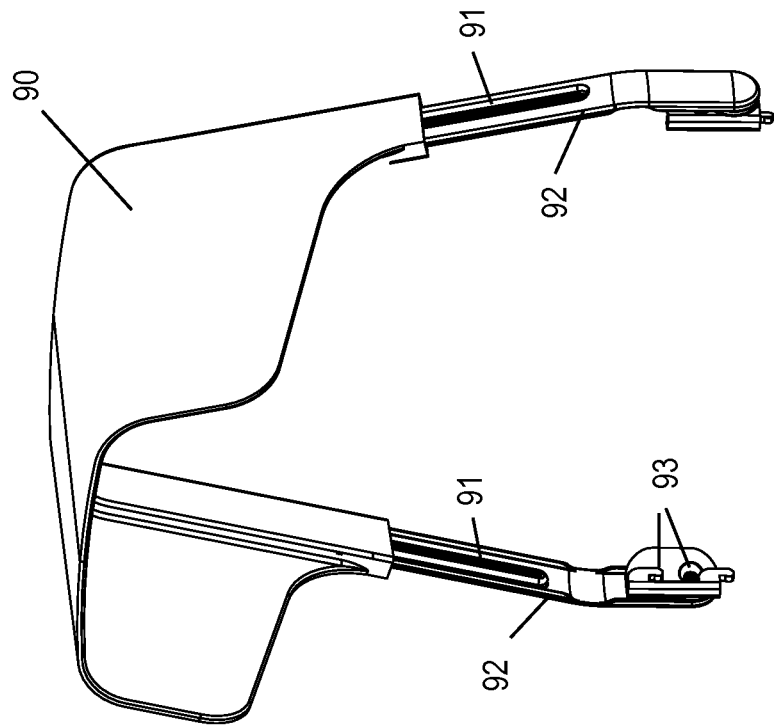
Figure 9A:
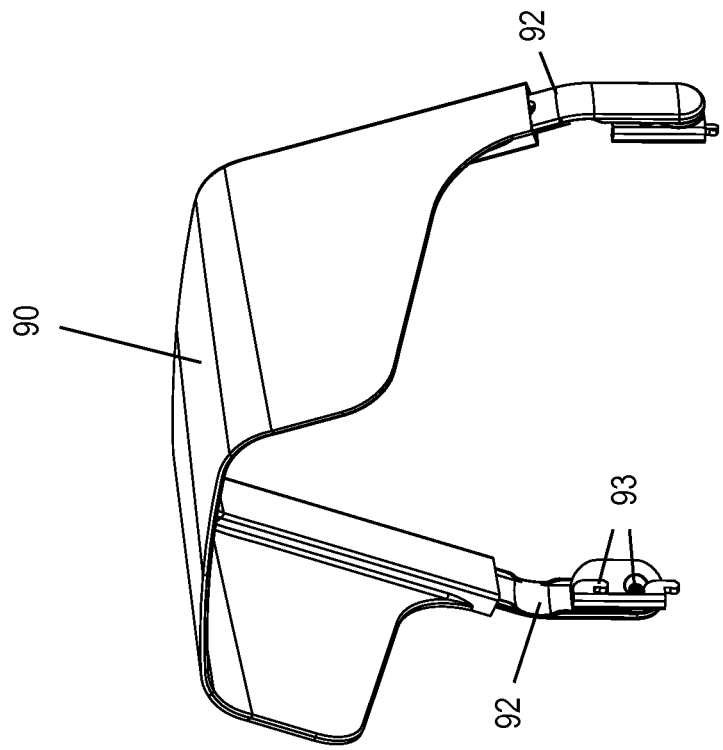
Figure 9C:
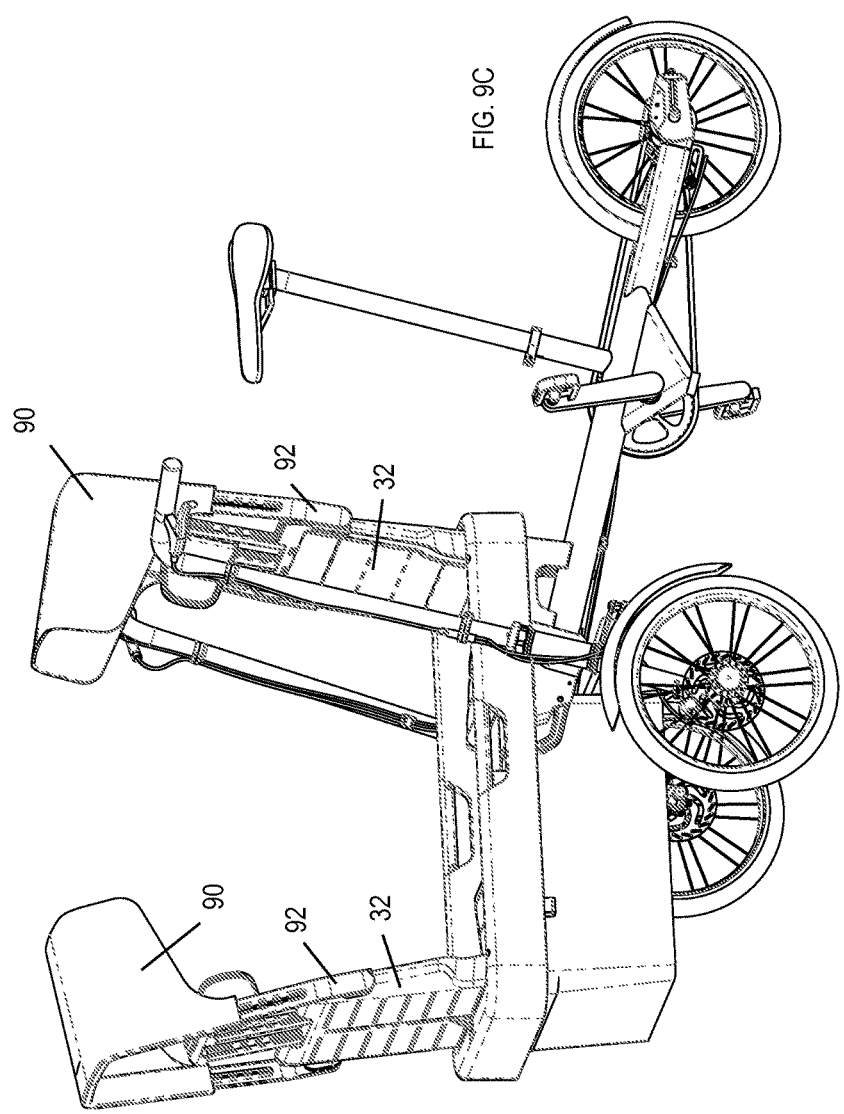

Reference is now made to FIGS. 9A, 9B and 9C, which illustrate a hood 90 with mounting arms 92 that mount on sides of back support 32, such as by means of lugs 93 that fasten to the sides of back support 32. Hood 90 slides in a track 91 formed in each mounting arm 92 and may be locked at different vertical positions by means of latches or pins or other fastener. Thus hood 90 can be lifted up and down to different heights.

Figure 10B:
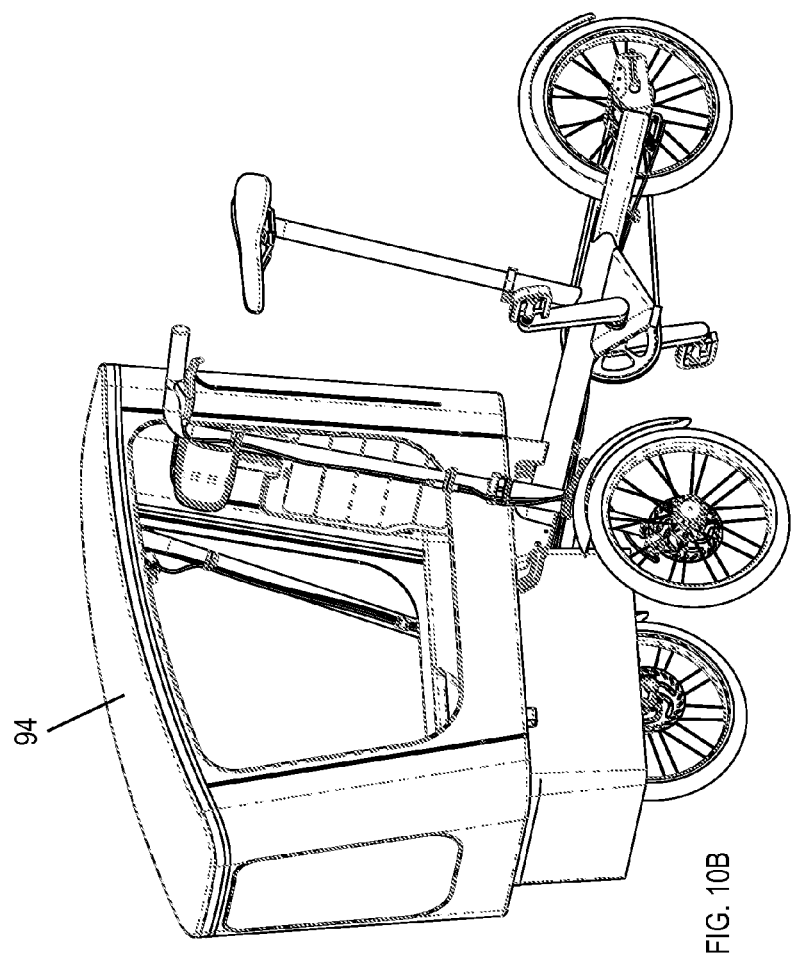
FIGS. 10A and 10B are simplified pictorial illustrations of a canopy with mounting arms, which can be inserted in holes in the seat frame or cycle frame, respectively before and after mounting on the frame.
Figure 10A:
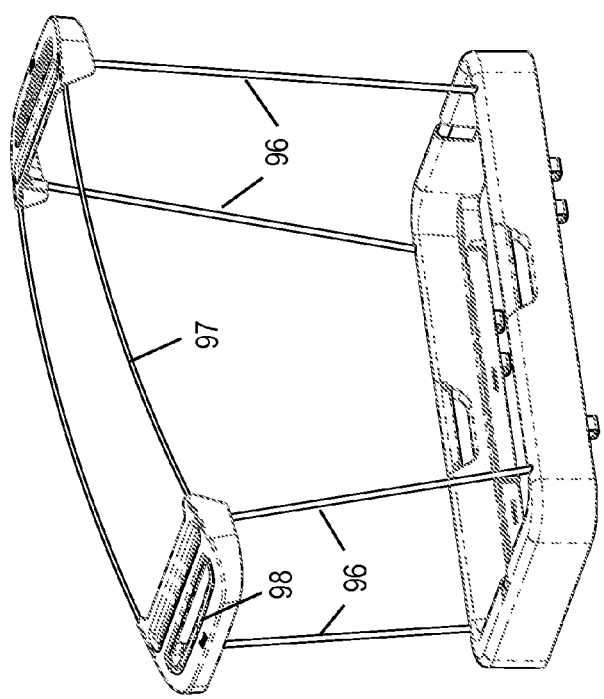

Reference is now made to FIGS. 10A and 10B, which illustrate a canopy 94 with mounting arms 96, which are flexible rods or other slender elongate members, which can be inserted in holes in the seat frame or cycle frame and stay secured to the frame by being in tension, so there is no need for screws or other fasteners. Canopy 94 may have an upper frame 97 and had grips 98.

What is claimed is:

1. A cargo cycle comprising:
   a frame;
   a plurality of wheels and a rider seat assembled on said frame; and
   a passenger compartment supported on said frame, said passenger compartment comprising a plurality of side walls and passenger seats disposed inwards of said side walls, said passenger seats having a plurality of reclining positions reclined at different angles relative to said side walls;
   wherein each of said passenger seats comprises a back support and a seat portion, said back support having a folded orientation in which it is folded down parallel to said seat portion and forms a cover that covers said passenger compartment, wherein said passenger seats are arrangeable to face each other, to face forwards or to face backwards.

2. The cargo cycle according to claim 1, wherein said passenger compartment comprises a bottom member, and in said folded orientation, said bottom member, said side walls and said back support form a closed box.

3. The cargo cycle according to claim 1, wherein in said folded orientation said back support does not protrude above the side walls of said passenger compartment.

4. The cargo cycle according to claim 1, wherein each of said passenger seats comprises a headrest adjustably connected to said respective back support.

5. The cargo cycle according to claim 4, further comprising harness straps that are attached to said headrest through apertures formed in each of said passenger seats.

6. The cargo cycle according to claim 1, wherein each of said passenger seats comprises a back support and a seat portion, wherein said seat portion is movable along rails, each of said rails being disposed along a length of each of a pair of said side walls, and wherein said seat portion comprises a protrusion receivable in any of a plurality of receiving members formed in said rails.

7. The cargo cycle according to claim 1, wherein one of said side walls comprises a latch member engageable with one of a plurality of latch receiving members formed on a rear portion of said at least one passenger seat.

8. The cargo cycle according to claim 1, wherein said back support is pivotally mounted to a pivot axis in at least one of said side walls.

9. The cargo cycle according to claim 8, wherein said back support comprises a pivot element pivotally mounted to said pivot axis, said pivot element slidingly received in a groove formed in said back support, wherein movement between said plurality of reclining positions comprises linear movement of said seat portion which causes said pivot element to slide in said groove and said back support to pivot about said pivot axis.

10. The cargo cycle cargo cycle according to claim 9, wherein a releasable catch is disposed in said groove.

11. The cargo cycle according to claim 1, wherein two of said side walls comprise hand grip members.

12. The cargo cycle according to claim 1, further comprising an accessory adapter attached to said side walls and adapted for fastening an accessory thereto.

13. A cargo cycle comprising:
a frame;
plurality of wheels and a rider seat assembled on said frame; and
a passenger compartment supported on said frame, said passenger compartment comprising a plurality of side walls and at least one passenger seat disposed inwards of said side walls, said at least one passenger seat having a plurality of reclining positons reclined at different angles relative to said side walls;
wherein said at least one passenger seat comprises a back support and a seat portion, said back support having a folded orientation in which it is folded down parallel to said seat portion and forms a cover that at least partially covers said passengers compartment; and
a safety element protruding from said side wall arranged to block said seat portion from limitlessly sliding, so as to prevent said back support from folding down.

14. A cargo cycle comprising:
a frame;
a plurality of wheels and a rider seat assembled on said, frame; and
a passenger compartment supported on said frame, said passenger compartment comprising a plurality of side walls and at least one passenger seat disposed inwards of said side walls, said at least one passenger seat having a plurality of reclining positions reclined at different angles relative to said side walls;
wherein said at least one passenger seat comprises a back support and a seat portion, said back support having a folded orientation in which it is folded down parallel to said seat portion and forms a cover that at least partially covers said passenger compartment; and
wherein said seat portion and one of said side walls comprise mating stoppers that limit linear movement of said seat portion.

* * * * *